United States Patent

Heller

[15] 3,682,300

[45] Aug. 8, 1972

[54] INFORMATION RETRIEVAL SYSTEM

[72] Inventor: Aaron L. Heller, 23 West 68th Street, New York, N.Y. 10023

[22] Filed: Nov. 27, 1970

[21] Appl. No.: 93,285

[52] U.S. Cl. ....................209/80.5
[51] Int. Cl. ....................B07c
[58] Field of Search....................209/80.5, 110.5

[56] References Cited

UNITED STATES PATENTS

| | | | |
|---|---|---|---|
| 873,305 | 12/1907 | Eckart | 309/80.5 |
| 867,930 | 10/1907 | Stretch | 209/80.5 |

FOREIGN PATENTS OR APPLICATIONS

| | | | |
|---|---|---|---|
| 1,368,823 | 6/1963 | France | 209/80.5 |

*Primary Examiner*—Allen N. Knowles
*Attorney*—Hubbell, Cohen & Stiefel

[57] ABSTRACT

An information retrieval system includes a housing in which a plurality of information bearing media, each having a tab-like protrusion cooperatively associated therewith at least one of a plurality of desired retrieval code positions, is retrievably stored in a stacked arrangement. The housing includes a slotted portion having a plurality of spaced apart slots which each extend transversely of the stack, each slot corresponding to a particular retrieval code position. The slots communicate with the stack and the exterior thereto. The tab-like protrusions are insertable in these slots. A selector means, such as a selector bar, is also provided which selector is selectively and removably registrable in a slot for engagement with the associated tab-like protrusion of the medium or media to be retrieved.

7 Claims, 6 Drawing Figures

PATENTED AUG 8 1972 3,682,300

INVENTOR
AARON HELLER
BY Hubbell, Cohen & Stiefel
ATTORNEYS.

INFORMATION RETRIEVAL SYSTEM

BACKGROUND OF THE INVENTION

1. Field of the Invention

The present invention relates to information retrieval systems in which a plurality of information bearing media are stored for selective retrieval.

2. Description of the Prior Art

Prior art information retrieval systems of what may be termed the card file type in which a plurality of card-like members are stored in a stacked arrangement for selective retrieval are primarily of a needle and aperture type. In this type of system, each of the cards has a plurality of apertures near the periphery of the card at coded positions. When it is desired to select or retrieve a particular card or set of cards from the stacked plurality, the needle is inserted through the desired aperture position and the stack is shaken until only the cards in which the needle extends through the appropriate aperture remain. This system is cumbersome and subject to frequent breakdown due to the relative ease in which the cards tear due to the violent shaking force and the small surface area alotted for resisting this force.

Other prior art systems have utilized a file box with a central slot having a finger which is movable along the length of the slot to select a group of cards. However, in such systems, there is no means provided for easily and accurately selecting the desired card or group of cards. Furthermore, in such a system no means is provided for cross-referencing cards so that with one movement of the selector finger all cards, including the cross-referenced cards, relating to a desired subject may be selected or retrieved. These disadvantages of the prior art are overcome by the present invention.

SUMMARY OF THE INVENTION

An information retrieval system is provided which includes a housing in which a plurality of information bearing media, each having a tablike protrusion cooperatively associated therewith at at least one of a plurality of desired retrieval code positions, is retrievably stored in a stacked arrangement. The housing includes a slotted portion having a plurality of spaced apart slots. Each of the slots extends transversely of the stack and communicates with the stack and the exterior to the stack. The slots correspond to the retrieval code positions. Each slot has a different indicium associated therewith, each of the indicium being associated with a desired information retrieval selection. The tab-like protrusions are insertable in the slots in accordance with the retrieval code positions.

A selector means, such as a selector bar, is also provided, which selector is selectively and removably registrable in a slot for engagement with the associated tab-like protrusion of the medium or media to be retrieved. The housing is preferably a box-like enclosure having an uppermost portion and a lowermost portion with the slotted portion being at the lowermost portion. The selector means comprises a removable cover for the lowermost portion wherein the cover includes the selector bar for insertion in each of the slots. One of the slots provides a neutral retrieval code position in which the tab-like protrusions are not engaged and the lowermost slotted portion is substantially covered. The information bearing media may be provided with an alignment code, such as a cut-out portion for assuring alignment of the media in the housing.

DETAILED DESCRIPTION OF THE PREFERRED EMBODIMENTS

Figure 1:
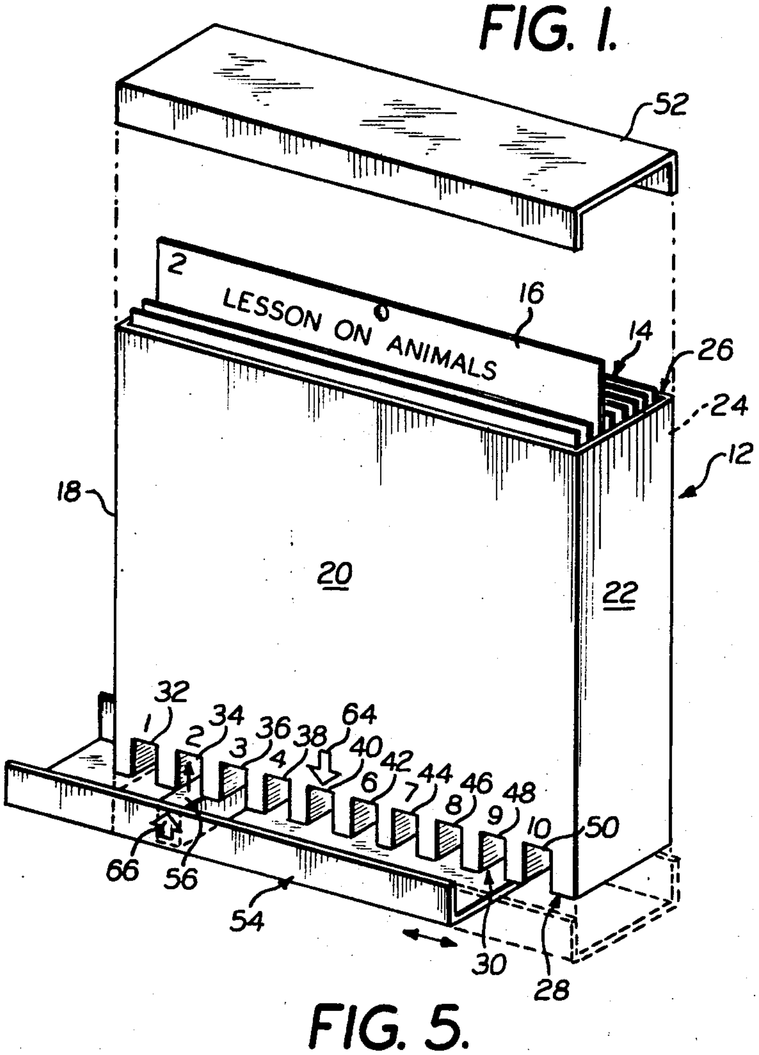
FIG. 1 is an exploded perspective view of the preferred embodiment of the present invention.

Referring now to the drawings in detail and especially to FIG. 1 thereof. The present invention includes a housing, generally referred to by the reference numeral 12, for retrievably storing a plurality of information bearing media 14, such as the card 16 shown by way of example in FIG. 2 and to be described in greater detail hereinafter. Preferably, the housing 12 forms a box-like enclosure for the information bearing media 14, which for purposes of illustration shall hereinafter be referred to as cards 16, although the invention is not limited to the use of cards as such media may be any filed unit that can be selected in the manner to be described, such as record albums or tape cassettes.

The housing 12 preferably includes four upstanding side walls 18, 20, 22 and 24 arranged to form the hollow box-like enclosure 12 which is open at the top end 26 thereof. The bottom end 28 of the box-like enclosure 12 formed by walls 18 through 24, inclusive, preferably includes a slotted portion 30 having a plurality of spaced apart slots 32 through 50, inclusive. Each of the slots 32 through 50, inclusive, preferably extends transversely of the stacked plurality 14 of cards 16 when the cards 16 are stored in the enclosure 12. Most preferably, slots 32 through 50, inclusive, extend perpendicular to the planes of the stacked plurality 14 of cards 16 between upstanding walls 20 and 24 so as to form notches therein. As shown and preferred in FIG. 1, each of the notches associated with the slots 32 through 50, inclusive, is designated by an associated indicium corresponding to a coded information retrieval position. As shown in FIG. 1, by way of example, the indicium designated as the numeral 2 corresponds to a lesson on animals. Preferably, the slots 32 through 50, inclusive, are equi-spaced, although if desired, a non-uniform spacing may be utilized.

As shown and preferred, the box-like enclosure portion 12 or storage case, has a cover 52 for the top 26 thereof and another cover 54 for the bottom portion 28 thereof. Most preferably, the bottom cover 54 includes a selector bar portion 56 which is fixedly mounted thereon and which is registrable in any desired one of the slots 32 through 50, inclusive. As will be described in greater detail hereinafter, the selector bar 56 acts as the selection means for retrieving the desired card or cards 16 from the storage case or enclosure portion 12.

Figure 2:
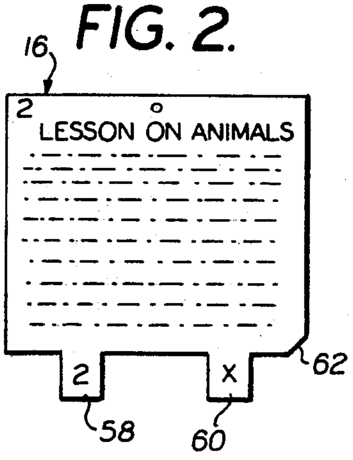
FIG. 2 is a plan view of a typical card which may be used in the embodiment shown in FIG. 1.

Referring now to FIG. 2, the card 16 shown and preferred, includes at least one tab-like protrusion 58 cooperatively associated with the card 16. As shown by way of example in FIG. 2, the tab-like protrusion 58 may be formed as a part of the card 16. If desired, although not shown, the tab-like protrusion 58 may be removably secured to the card 16, or, in the alternative, it may be separately formed from, but fixedly secured to, card 16. The tab-like protrusion 58 is preferably located in the retrieval coded position corresponding to one of the slots 32 through 50, inclusive, so that when the card 16 is inserted in the storage enclosure 12, the tab-like protrusion 58 will protrude into the particular slot 32 through 50, inclusive, corresponding to the particular coded position. This tab-like protrusion 58 may be termed the primary retrieval code.

If desired, the card 16 may also be coded with at least one or more cross-reference tab-like protrusions 60 which are located at desired cross-reference retrieval code positions so as to protrude into the particular associated slot 32 through 50, inclusive, to which the particular cross-reference applies. Only one such cross-reference tab-like protrusion 60 is shown for purposes of illustration, although others may be included if desired. Furthermore, although the tab-like protrusion 60 is shown as being an integral part of the card 16 by way of example, it also may be separately formed from and either removably or fixedly secured to card 16. In addition, if desired, an alignment code 62, such as the angular notch 62 shown by way of example in FIG. 2, may be included on the face of the card 16 for purposes of properly aligning the direction of the card 16 in the storage enclosure 12, so that the tab-like protrusions 58 and 60 protrude into the proper slots 32 trough 50, inclusive.

OPERATION

In utilizing the information retrieval system of the present invention, the top cover 52 is removed from the storage enclosure 12. The bottom cover 54 is removed from the storage enclosure 12 and moved until the selector bar 56 is in registration with the desired slot 32 through 50, inclusive, corresponding to the information to be retrieved. The storage enclosure 12 is then placed down upon the cover 54 so as to dispose the selector bar 56 in the particular slot, such as slot 34 shown by way of example in FIG. 1. Selector bar 56 will engage all the tab-like protrusions, including primary reference tabs 58 as well as any cross-reference tabs 60, which protrude into this slot 34 and will exert an upward force on these cards 16 so as to cause them to extend up above the balance of the cards 16 contained in the storage enclosure 12. Thereafter, the user can then easily pull these selected cards out of the storage enclosure 12. When it is desired to place the selected cards 16 back in the storage enclosure 12, if they are facing in the proper direction, they may be placed in any location in the enclosure 12 as the tab-like protrusions 58 and 60 will protrude through the appropriate slots 32 through 50, inclusive, which extend between walls 20 and 24.

Figure 6:
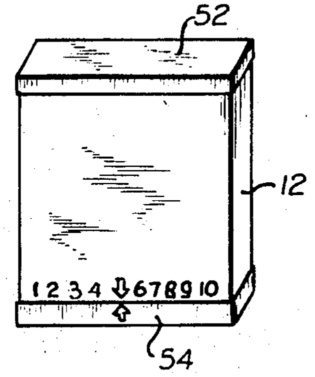
FIG. 6 is a perspective view of the embodiment shown in FIG. 1.

As shown and preferred, one of the slots 40 is the neutral slot as indicated by the arrowhead indicium 64, a corresponding arrowhead indicium 66 being located on the face of the bottom cover 54. When the selector bar 56 is registered in slot 40 with the arrows 64 and 66 opposite each other, no tab-like protrusions 58 or 60 are engaged and the storage enclosure 12 may be closed such as shown in FIG. 6, with the top cover 52 also being placed on the storage enclosure 12.

ALTERNATIVE EMBODIMENT

Figure 3:
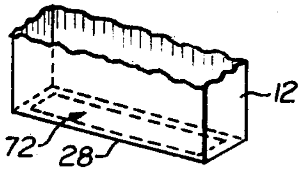
FIG. 3 is a fragmentary perspective view of the housing of a modified form of the embodiment shown in FIG. 1.
Figure 4:
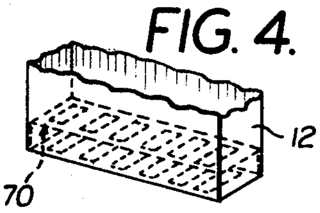
FIG. 4 is a fragmentary perspective view similar to that shown in FIG. 3 with the slotted member assembled within the housing.
Figure 5:
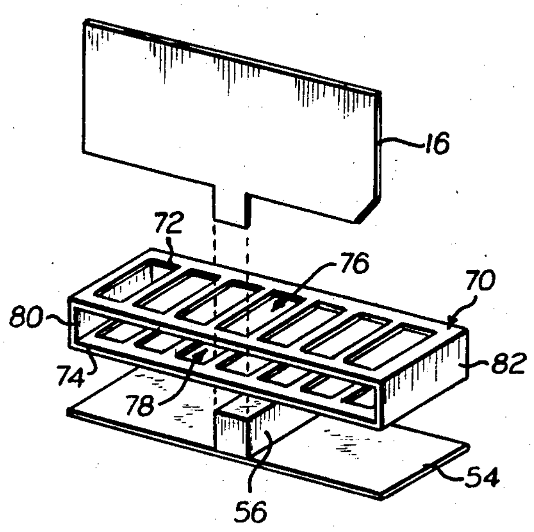
FIG. 5 is an exploded fragmentary perspective view of an alternative embodiment of the present invention.

As shown in FIGS. 3, 4 and 5 if desired, the slotted portion 30 of the storage enclosure 12 may be replaced by a removable slotted member 70 which is insertable in the storage portion 12 through the top 26 thereof. Slotted member 70 preferably includes a pair of parallel spaced apart portions 72 and 74, which are preferably identical, each having a plurality of parallel transverse slots 76 and 78, respectively, therein arranged in parallel pairs so as to form through slots therein similar to slots 32 through 50 inclusive of the embodiment shown in FIG. 1. The slotted portions 72 and 74 are held in spaced apart relation by upstanding supporting members 80 and 82 which preferably form, with portions 72 and 74, a hollow rectangular configuration having outer dimensions slightly smaller than the inner dimensions of the rectangular storage enclosure 12 so as to permit insertion therein through the top 26. Of course, if desired slotted member 70 could be formed as a single solid member having slots similar to slots 32 through 50 inclusive, formed therein.

As shown in FIG. 3, the bottom portion 28 of the storage enclosure 12 in this modified embodiment is formed with one single cut-out portion 72 having a framing portion 74 for the cut-out 72. The cut-out 72 is slightly smaller in size than the outer dimensions of the insertable slotted member 70 so as to retain the slotted member 70 within the storage enclosure 12 by means of framing portion 74. If desired, slotted member 70 may be secured to the framing portion 74 such as by an adhesive. The balance of the structure is identical with that previously described with reference to FIG. 1 with each of the slots 32 through 50, inclusive, communication with the stack 14 and the exterior thereof, and will not be described in greater detail hereinafter. The manner of operation of the information retrieval system of the embodiment shown in FIGS. 3 through 5, inclusive, is identical with that previously described with reference to FIG. 1.

By utilizing the information retrieval system of the present invention, information bearing media such as cards or record albums may be stored in a case from which they may be easily selectively retrieved.

It is to be understood that the above described embodiments of the present invention are merely illustrative of the principles thereof and that numerous modifications and embodiments of the invention may be derived within the spirit and scope thereof.

What is claimed is:

1. A system for retrievably storing a plurality of information bearing media each having a tab-like protrusion cooperatively associated therewith at at least one of a plurality of desired retrieval code positions, comprising:

a housing for retrievably storing said media in a stacked arrangement, said housing including a slotted portion having a plurality of spaced apart slots, each of said slots extending transversely of said stack and communicating with said stack and the exterior to said stack, said slots corresponding to said retrieval code positions, said tab-like protrusions being insertable in said slots in accordance with said retrieval code positions; and a means for selectively retrieving at least one of said media, said selector means being selectively and removably disposable in one of said slots for displacing said associated tab-like protrusion of said one medium out of said slot, whereby to selectively displace said at least one media from said plurality of media, said selector means comprising a removable cover for said slotted portion, said cover substantially covering said slotted portion in a neutral retrieval code position, said tab-like protrusions being out of engagement with said selective retrieving means in said neutral position.

2. A system in accordance with claim 1, wherein said stacked arrangement comprises a plurality of substantially planar media.

3. A system in accordance with claim 1, wherein said slots extend substantially perpendicular to said stack in spaced apart relation to each other.

4. A system in accordance with claim 1, wherein said selector means includes a selector bar, said selector bar being insertable in said slots.

5. A system in accordance with claim 6, wherein each of said slots is of substantially the same length, said selector bar having a length substantially equal to said slot length.

6. A system in accordance with claim 1, wherein said housing comprises a substantially hollow box-like enclosure having an uppermost portion and a lowermost portion, said uppermost portion having an aperture therein for passage of said media therethrough.

7. A system in accordance with claim 1, wherein each of said retrieval code positions has a different indicium associated therewith, each of said indicium being associated with a desired information retrieval selection.

* * * * *